US007606888B2

(12) United States Patent
Tanner et al.

(10) Patent No.: US 7,606,888 B2
(45) Date of Patent: Oct. 20, 2009

(54) APPROACH FOR MANAGING NETWORK DEVICE CONFIGURATION DATA

(75) Inventors: David Anthony Tanner, Saratoga, CA (US); Jasvinder Singh Bhasin, San Jose, CA (US); Ping Wang, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 928 days.

(21) Appl. No.: 10/723,301

(22) Filed: Nov. 24, 2003

(65) Prior Publication Data

US 2005/0114315 A1 May 26, 2005

(51) Int. Cl.
G06F 15/173 (2006.01)
(52) U.S. Cl. ............... 709/223; 709/221; 717/121; 715/735; 715/736
(58) Field of Classification Search ........... 709/223, 709/224, 220, 221; 717/121; 715/700, 735, 715/736
See application file for complete search history.

(56) References Cited

U.S. PATENT DOCUMENTS

| 6,286,038 | B1 | 9/2001 | Reichmeyer et al. | |
|---|---|---|---|---|
| 6,308,205 | B1 | 10/2001 | Carcerano et al. | |
| 6,615,088 | B1 * | 9/2003 | Myer et al. | 709/220 |
| 6,636,952 | B1 | 10/2003 | Zhang et al. | |
| 6,687,739 | B2 | 2/2004 | Anupam et al. | |
| 6,895,013 | B1 * | 5/2005 | Burns et al. | 370/401 |
| 6,901,580 | B2 * | 5/2005 | Iwanojko et al. | 717/121 |
| 6,983,421 | B1 * | 1/2006 | Lahti et al. | 715/763 |
| 7,039,724 | B1 * | 5/2006 | Lavian et al. | 709/250 |
| 7,039,875 | B2 * | 5/2006 | Khalfay et al. | 715/762 |
| 7,047,495 | B1 * | 5/2006 | Pang | 715/736 |
| 2002/0198974 | A1 | 12/2002 | Shafer | |
| 2002/0199184 | A1 * | 12/2002 | Cezeaux | 725/9 |
| 2003/0105761 | A1 * | 6/2003 | Lagerman | 707/10 |
| 2003/0140132 | A1 | 7/2003 | Champagne et al. | |

(Continued)

FOREIGN PATENT DOCUMENTS

WO    WO 9410645 A1 *    5/1994

OTHER PUBLICATIONS

International Searching Authority, "Notification of Transmittal of the International Search Report and the Written Opinion of the International Searching Authority, or the Declaration," PCT/US04/38990, dated Mar. 15, 2006, 10 pages.

(Continued)

Primary Examiner—Oanh Duong
(74) Attorney, Agent, or Firm—Hickman Palermo Truong & Becker LLP

(57) ABSTRACT

An approach is provided for managing network device configuration data by functional area. Functional areas supported by a network device are determined. A determination is also made whether a client and the network device support compatible configuration application program interfaces (APIs) for each functional area supported by the network device. User interface objects are generated and displayed on a graphical user interface (GUI). Each user interface object corresponds to one of the functional areas that is supported by the network device and for which the client and network device have compatible configuration APIs. A set of bulk editing functions allows changes to be readily made to multiple configuration data objects and to facilitate creating new configuration data objects.

43 Claims, 7 Drawing Sheets

U.S. PATENT DOCUMENTS

| | | | |
|---|---|---|---|
| 2004/0031030 A1* | 2/2004 | Kidder et al. | 717/172 |
| 2004/0059801 A1 | 3/2004 | Nakanishi et al. | |
| 2004/0059813 A1* | 3/2004 | Bolder et al. | 709/224 |
| 2004/0120344 A1* | 6/2004 | Sato et al. | 370/465 |
| 2004/0128370 A1* | 7/2004 | Kortright | 709/221 |
| 2004/0193906 A1* | 9/2004 | Dar et al. | 713/200 |
| 2005/0047326 A1* | 3/2005 | Puon et al. | 370/216 |
| 2006/0173999 A1* | 8/2006 | Rider et al. | 709/225 |

OTHER PUBLICATIONS

Claims, PCT/US04/38990, 16 pages.

* cited by examiner

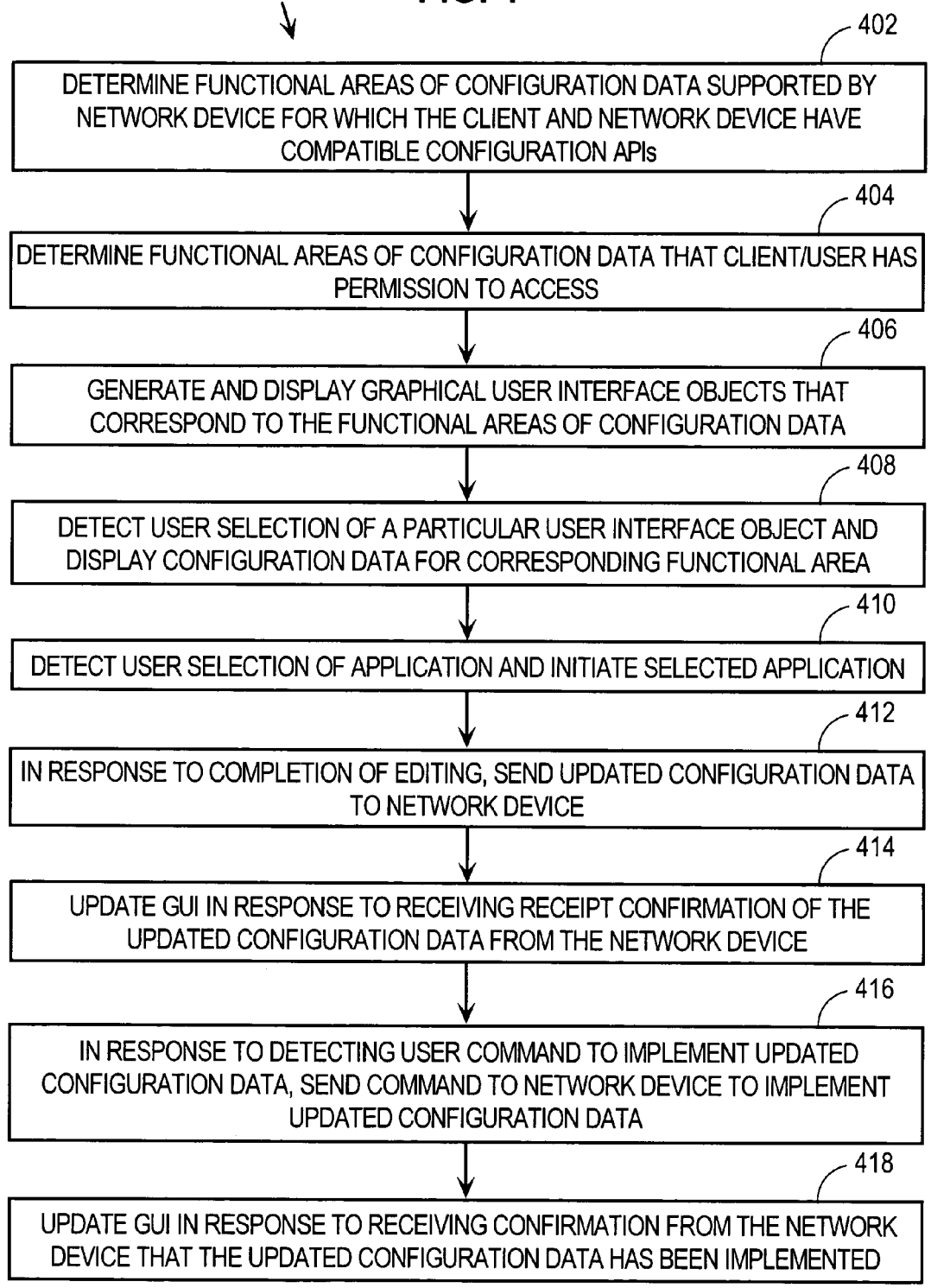

CONFIGURATION DATA 120

| ID | IP ADDR | SEQ NO | ATTRX |
|---|---|---|---|
| ID1 | 1.160.10.240 | 0 | X7V14 |
| ID2 | 1.160.10.254 | 1 | T57Z5 |
| ID3 | 1.160.10.167 | 2 | X9T12 |

CONFIGURATION DATA 120

| ID | IP ADDR | SEQ NO | ATTRX |
|---|---|---|---|
| ID1 | 1.150.10.240 | 0 | X7V14 |
| ID2 | 1.150.10.254 | 1 | T57Z5 |
| ID3 | 1.150.10.167 | 2 | X9T12 |

CONFIGURATION DATA 120

| ID | IP ADDR | SEQ NO | ATTRX | ATTRY |
|---|---|---|---|---|
| ID1 | 1.160.10.240 | 0 | X7V14 | TR312 |
| ID2 | 1.160.10.254 | 1 | T57Z5 | TR312 |
| ID3 | 1.160.10.167 | 2 | X9T12 | TR312 |

CONFIGURATION DATA 120

| ID | IP ADDR | SEQ NO | ATTRX |
|---|---|---|---|
| ID1 | 1.160.10.240 | 0 | X7V14 |
| ID2 | 1.160.10.254 | 1 | T57Z5 |
| ID3 | 1.160.10.240 | 2 | X7V14 |

FIG. 5E

CONFIGURATION DATA ─ 120

| ID | IP ADDR | SEQ NO | ATTRX |
|---|---|---|---|
| ID1 | 1.160.10.240 | 0 | X7V14 |
| ID2 | 1.160.10.254 | 1 | T57Z5 |
| ID3 | 1.160.10.167 | 2 | X9T12 |
| ID4 | 1.160.10.240 | 3 | |
| ID5 | 1.160.10.240 | 4 | |

# APPROACH FOR MANAGING NETWORK DEVICE CONFIGURATION DATA

FIELD OF THE INVENTION

This invention relates generally to networking, and more specifically, to an approach for managing network device configuration data.

BACKGROUND OF THE INVENTION

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Many network devices, such as routers, gateways and hubs, store configuration data that defines how the network devices operate. For example, configuration data may define interfaces, communications protocols, security protocols and operational parameters for a network device. Configuring of network devices is conventionally done manually, for example using a text editor to create a text file containing a set of configuration data for a network device. The text file is downloaded to the network device and the network device begins using the configuration data.

Over time, circumstances may require that the configuration data be updated. For example, configuration data may need to be updated to reflect a change in the definition of an existing interface, or to add a new interface definition. As another example, configuration data may need to be updated to change operational parameters of a network device. In this situation, all of the configuration data is retrieved from the network device and then manually edited. Updating configuration data is conventionally done by deleting and adding lines of configuration data using a command line editor or a graphical editor. The updated configuration data is then downloaded to the network device and the network device begins using the updated configuration data.

Manually creating and editing network device configuration data is tedious and prone to errors, particularly for network devices that use large amounts of configuration data. The file containing all of the configuration data for the network device must be downloaded and then manually edited. There are also situations where it is desirable to reuse configuration data across multiple network devices, for example when a large number of identical network devices are deployed. Using conventional editing tools to create multiple copies of configuration data and then to customize the configuration data for particular network devices is also tedious and prone to errors.

Based on the foregoing, there is a need for an approach for managing network device configuration data that does not suffer from limitations of prior approaches is highly desirable. There is a particular need for an approach for managing network device configuration data that reduces the likelihood of errors when the configuration data is updated. There is a further need for an approach for managing network device configuration data that is more user friendly and efficient than conventional approaches. There is also a need for an approach for managing network device configuration data that provides a useful mechanism for reusing configuration data on a single network device or across multiple network devices.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flow diagram that depicts an approach for editing and implementing configuration data by functional area according to an embodiment of the invention.

FIGS. 5A-5E are block diagrams that depict various states of configuration data during processing via bulk editing functions, according to an embodiment of the invention.

DETAILED DESCRIPTION OF THE INVENTION

Figure 1:
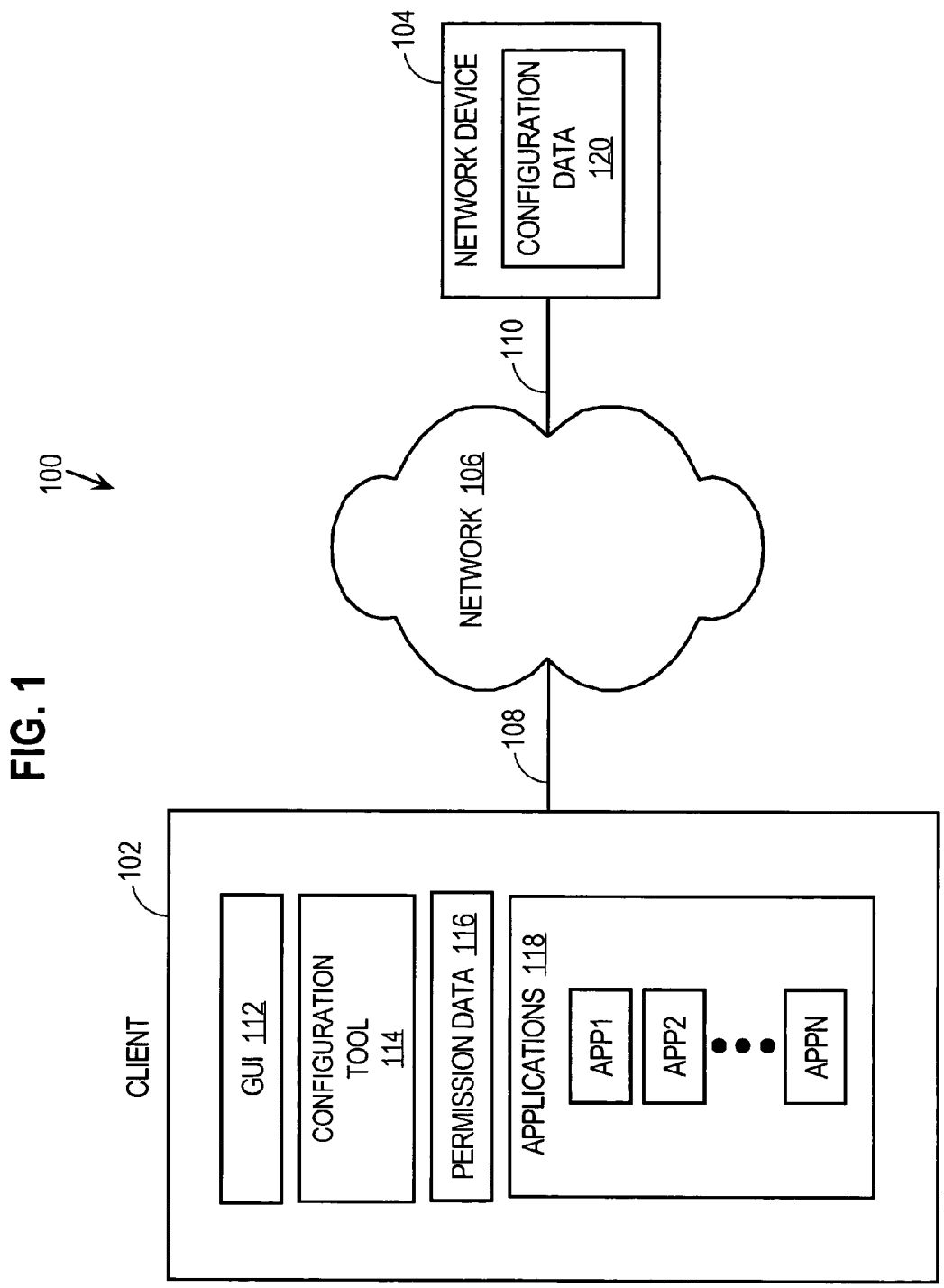
FIG. 1 is a block diagram that depicts an architecture for managing network device configuration data by functional area according to an embodiment of the invention.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. CONFIGURATION DATA MANAGEMENT ARCHITECTURE
III. ESTABLISHING FUNCTIONAL AREAS OF CONFIGURATION DATA
IV. MANAGING NETWORK DEVICE CONFIGURATION DATA BY FUNCTIONAL AREA
V. VIEWING NETWORK DEVICE CONFIGURATION DATA BY FUNCTIONAL AREA
VI. EDITING NETWORK DEVICE CONFIGURATION DATA BY FUNCTIONAL AREA
VII. MULTI-CLIENT IMPLEMENTATIONS
VIII. BULK MANAGEMENT OF NETWORK DEVICE CONFIGURATION DATA
IX. IMPLEMENTATION MECHANISMS

I. Overview

An approach is provided for managing network device configuration data by functional area. Functional areas supported by a network device are determined. A determination is also made whether a client and the network device support compatible configuration application program interfaces (APIs) for each functional area supported by the network device. User interface objects are generated and displayed on a graphical user interface (GUI). Each user interface object corresponds to one of the functional areas that is supported by the network device and for which the client and network device have compatible configuration APIs. The user interface objects may be arranged and displayed on the GUI in a manner to indicate hierarchical relationships between the corresponding functional areas. A user may select a user interface object to view the configuration data for the corresponding functional area. The user may update the corresponding configuration data and the updated configuration data is supplied to the network device. The user may also select a user interface object to cause the network device to implement the updated configuration data. User interface objects may also be generated and displayed for functional areas that are supported by a configuration application but not supported by the network device. The visual appearance of user interface objects may be selected to indicate a variety of conditions. Example conditions include whether configuration data has been updated and provided to a network device, user permissions, applicability of a functional area to a particular context, version mismatch and lock state. User access to user interface objects, and the corresponding configuration data, may be controlled based upon node state that indicates functional areas that users are allowed to access. A set of bulk editing functions allows changes to be readily made to multiple configuration data objects and to facilitate creating new configuration data objects. The bulk editing functions include multi-row edit, copy and paste and cloning.

II. Configuration Data Management Architecture

FIG. 1 is a block diagram that depicts an architecture 100 for managing network device configuration data based upon functional areas according to an embodiment of the invention. Architecture 100 includes a client 102 communicatively coupled to a network device 104 via a network 106 and communications links 108, 110. Network 106 and communications links 108, 110 may be implemented by any mechanism or medium for exchanging data between client 102 and network device 104. Example implementations of network 106 and communications links 108, 110 include, without limitation, a network such as a Local Area Network (LAN), Wide Area Network (WAN), Ethernet or the Internet, or one or more terrestrial, satellite or wireless links. Client 102 and network device 104 are depicted in the figures as being disposed external to network 106 for purposes of explanation only. Client 102 and network device 104 may be disposed internal to network 106 or external to network 106, depending upon the requirements of a particular implementation.

Client 102 includes a GUI 112, a configuration tool 114 and permission data 116. Client 102 also includes applications APPL1, APP2 through APPN, designated collectively by the reference numeral 118. GUI 112 may be implemented by any type of mechanism or medium for conveying information to a user. Example implementations of GUI 112 include a CRT, LCD, or other similar display device. Configuration tool 114 resides on client 102 and provides for the management of network device configuration data as described in more detail hereinafter. Configuration tool 114 may be implemented as part of a network management mechanism or may be implemented as a separate stand-alone mechanisms. Permission data 116 is used to control user access to network device configuration data as described in more detail hereinafter. Applications 118 provide for user modification of data as described in more detail hereinafter. Network device 104 includes configuration data 120.

III. Establishing Functional Areas of Configuration Data

According to one embodiment of the invention, functional areas of configuration data may be established once the configuration data for network devices is defined. For example, suppose that a particular network device will support three different interfaces. Configuration data is defined for those three interfaces and the particular network device. A set of functional areas of configuration data is defined for the particular network device. In this example, the set of functional areas includes a functional area for each interface. A functional area may also be defined for the configuration data that is common to all three interfaces. For example, suppose that each interface has an assigned IP address. The IP address configuration data may be associated with a common interface functional area. As described in more detail hereinafter, this allows a user to selectively view and edit the IP addresses for all interfaces separate from the other configuration data for the three interfaces.

Some network devices include multiple hardware components, where each hardware component has its own configuration data. For example, a particular network device may include several Packet Over Sonet (POS) cards, where each POS card has its own configuration data. One or more functional areas of configuration data may be defined for each hardware component. Also, functional areas of configuration data may be defined for multiple hardware components. In the prior example, one or more functional areas of configuration data may be defined for each POS card. Also, one or more functional areas of configuration data may be defined for multiple POS cards. For example, a common functional area of configuration data may be defined for two or more POS cards in a network device.

Functional areas may be dynamic and change over time. As configuration data is changed over time, functional areas may be added or removed. For example, suppose that a determination is made that a network device is to support a new interface. The configuration data for the new interface is generated and downloaded to the network device. A new functional group may be created for the new interface. As another example, suppose that a new operational parameter is added to the definition of all interfaces. In this situation, the new operational parameter may be added to the common interface functional area. Functional groups may also be deleted if the corresponding configuration data is no longer used.

IV. Managing Network Device Configuration Data by Functional Area

The configuration data for network devices may vary across network devices depending upon a variety of factors, such as the functionality of the network devices and how the network devices are configured. Thus, different functional areas of configuration data may be applicable to different network devices. For example, suppose that a first network device is configured to support a first API and a second network device is configured to support a second API. Assuming that separate functional areas are defined for the first and second APIs, then the functional area corresponding to the first API is relevant for managing the first network device, but not the second network device, since the second network device does not support or need configuration data for the second API. Similarly, the functional area corresponding to the second API is relevant for managing the second network device, but not the first network device, since the first network device does not support or need configuration data for the first API.

According to one embodiment of the invention, the first step in determining functional areas to be managed for a network device is to determine the functional areas supported by the network device. This determination information may be made using a variety of techniques. For example, configuration tool 114 may query network device 104 for the functional areas supported by network device 104. Alternatively, configuration tool 114 may consult local data that specifies the functional areas supported by network device 104. As yet another example, configuration tool 114 may consult a database via network 106 that stores this information.

Once the functional areas supported by network device 104 are known, a determination is made whether client 102 and network device 104 have compatible configuration APIs for those functional areas. This may be determined, for example, by configuration tool 114 querying network device 104, or by configuration tool 114 consulting data that specifies the configuration APIs supported by client 102 and network device 104. According to one embodiment of the invention, this determination is made on a functional area by functional area basis.

According to one embodiment of the invention, once the functional areas supported by network device 104 are known, for which client 102 and network device 104 have compatible configuration APIs, permission data 116 is evaluated to determine whether client 102, or a user of client 102, has permission to access the functional areas. Permission data 116 may specify read and update only access or read, update and implement (commit) access, depending upon the requirements of a particular application. Once it is known which functional areas the client 102, or user of client 102, has permission to access, then the configuration data may be viewed and edited as described in more detail hereinafter. Permission data 116 may also affect the functional area node state visual display, as described in more detail hereinafter.

V. Viewing Network Device Configuration Data by Functional Area

Figure 2:
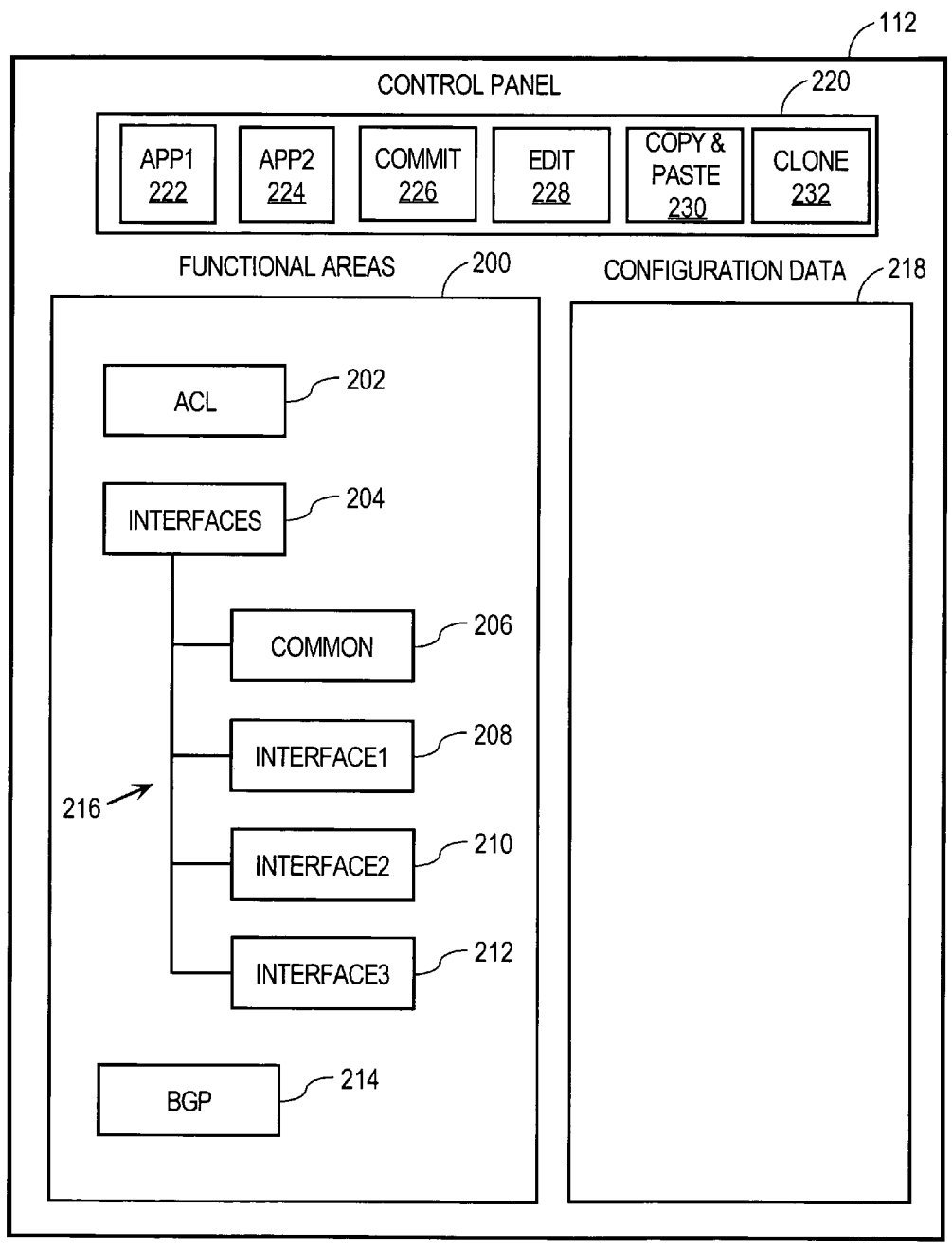
FIG. 2 is a block diagram that depicts a graphical user interface configured to manage network device configuration data by functional area according to an embodiment of the invention.
Figure 3:
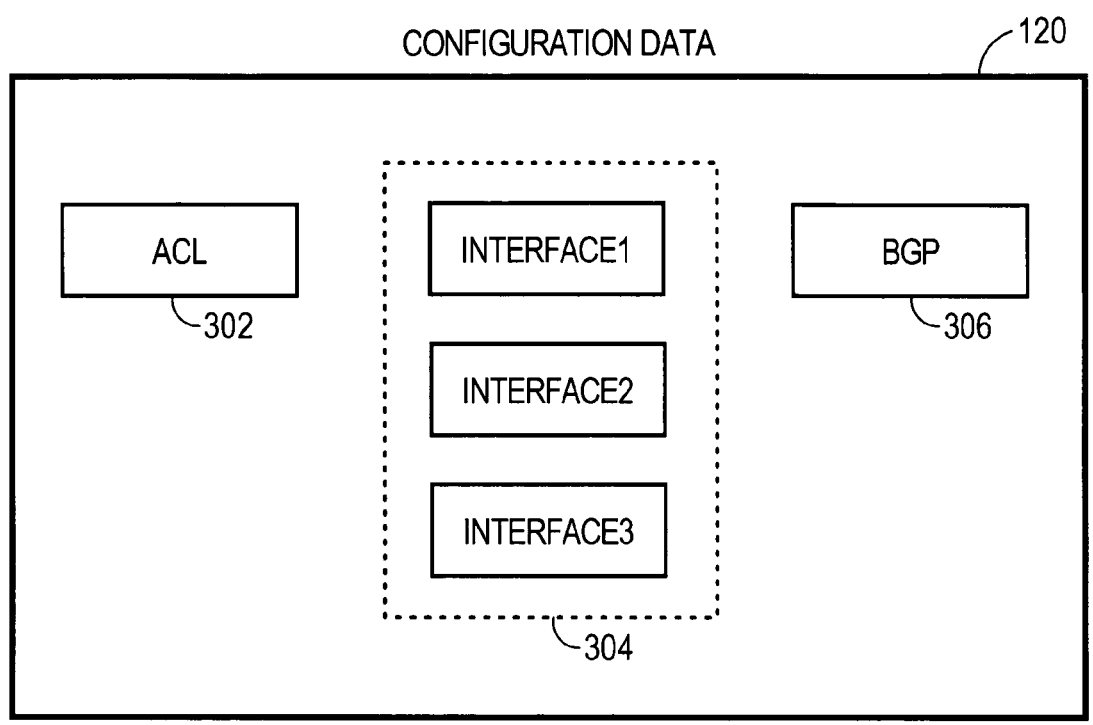
FIG. 3 is a block diagram that depicts example network device configuration data.

According to one embodiment of the invention, users may view configuration data by functional area. FIG. 2 is a block diagram that depicts an implementation of GUI 112 according to one embodiment of the invention. In this example, GUI 112 includes a display area 200 in which user interface objects 202-214 are displayed that each correspond to a different functional area of configuration data 120 stored in network device 104. For example, referring to both FIG. 2 and FIG. 3, user interface object 202 corresponds to access control list (ACL) configuration data 302. User interface objects 204-212 correspond to interface configuration data 304 that includes interface configuration data for interfaces INTERFACE1, INTERFACE2 and INTERFACE3. This approach also readily conveys to a user those functional areas that are not supported by a network device since there is no corresponding user interface object displayed in display area 200. For example, if there is no user interface object for interface XYZ displayed in display area 200, then a user can quickly know that the network device is currently not configured for the XYZ interface.

User interface object 206 (COMMON) corresponds to configuration data that is common to all three interfaces INTERFACE1, INTERFACE2 and INTERFACE3, and is therefore presented to the user as a separate functional area. According to one embodiment of the invention, the functional area for common interface data is established based upon the interfaces supported by network device 104, and the configuration data that is common to those interfaces. User interface object 214 corresponds to border gateway protocol (BGP) configuration data 306.

According to one embodiment of the invention, user interface objects 202-214 are arranged in display area 200 in a manner to visually indicate a functional hierarchy of the corresponding functional areas of configuration data. In the present example, user interface objects 206, 208, 210 and 212 are indented with respect to user interface object 204 to visually indicate that the functional areas associated with user interface objects 206, 208, 210 and 212 are related to the functional area associated with user interface object 204. More specifically, the relative placement of user interface objects 206, 208, 210 and 212 with respect to user interface object 204 and the use of lines 216, in the form of a tree, collectively visually indicate that the functional areas associated with user interface objects 206, 208, 210 and 212 are specific functional areas of the interface functional area associated with user interface object 204.

According to one embodiment of the invention, in response to detecting a user selection of a user interface object, the configuration data that corresponds to the selected user interface object is retrieved from the network device and displayed in a display window 218. For example, suppose that a user selects user interface object 206 using a mouse, trackball, scratchpad, keyboard or other selection mechanism. Configuration tool 114 detects that user interface object 206 has been selected and retrieves the configuration data 120 from network device 104 for the functional area that corresponds to user interface object 206. In the present example, configuration tool 114 retrieves the configuration data 120 that is common to INTERFACE1, INTERFACE2 and INTERFACE3. Configuration tool 114 then causes this configuration data to be displayed in display window 218 on GUI 112. Any type of retrieval mechanism or protocol may be used to retrieve configuration data from network devices, depending upon the requirements of a particular application, and the invention is not limited to any particular mechanism or protocol. After the configuration data is displayed in display window 218, the visual appearance of user interface object 206 may be changed to indicate that the configuration data displayed in display window 218 is associated with user interface object 206 and is therefore the configuration data for the common interface functional area. For example, the visual appearance of user interface object 206 may be changed to indicate that the user has selected user interface object 206. Various techniques for visually indicating this condition are well known in the GUI art and the invention is not limited to any particular technique.

According to one embodiment of the invention, the visual appearance of user interface objects 202-214 is selected to reflect whether a client or user has permission to access the configuration data for the corresponding functional areas. This may include changing any display attributes of user interface objects 202-214. For example, suppose that a determination is made that a user does not have permission to access the configuration data for the functional area corresponding to user interface object 206. In this situation user interface object 206 is displayed with a different color or shade than other user interface objects. Also, the user is unable to select user interface object 206 as can be done with the other user interface objects. Alternatively, a user interface object may visually indicate that a user has permission for read-only access, but not write access, to a functional area of configuration data. The visual appearance of user interface objects 202-214 may also be selected to reflect a variety of other conditions, such as whether configuration data has been updated and provided to a network device, the applicability of a functional area to a particular context, version mismatch and lock state.

VI. Editing Network Device Configuration Data by Functional Area

According to one embodiment of the invention, a user is provided with the capability to initiate any number of applications to edit network device configuration data. Initiating applications may be accomplished using a wide variety of techniques, depending upon the requirements of a particular application. For example, suppose that a user selects user interface object 206 and the COMMON interface configuration data is displayed in display area 200. A user may use a mouse or pointing device to launch an application. For example, a user may "right click" on user interface object 206 to view a list of available applications that can be launched. The applications may include any type of application, such as a graphical editor or a command line editor. Other applications may be initiated, depending upon the requirements of a particular application. As another example, a user may initiate an application by selecting a corresponding user interface object from control panel 220. For example, a user may select user interface object 222 to initiate application APP1 from applications 118. Alternatively, the user may select user interface object 224 to initiate application APP2 from applications 118.

Once a user has initiated an application, the user edits the configuration data for a functional area. At some point the user indicates that the editing has been completed. A user may indicate this in different ways, depending upon the application used to edit the configuration data. For example, a user may select a "save" or "done" option in an application to indicate that the user has finished editing the configuration data. Upon completion of the editing, the updated configuration data is provided to network device 104. For example, configuration tool 114 may detect that editing of configuration data has been completed and then send the updated configuration data to network device 104. Network device 104 then implements the updated configuration data. According to one embodiment of the invention, only updated configuration data is provided to a network device. Configuration data that is not changed at a client is not returned to a network device.

According to one embodiment of the invention, a two-phase commit approach is used to implement updated configuration data on a network device. During the first phase, configuration data for a functional area is updated and provided to a network device. The network device may store the updated configuration data and may generate and send a confirmation to the client that sent the updated configuration data. The network device does not yet implement the updated configuration data, however. During the second phase, a user indicates that the updated configuration data is to be implemented by the network device. For example, a user may select user interface object 226 within control panel 220. The network device is then notified to implement the updated configuration data. According to one embodiment of the invention, the network device implements all of the updated configuration data that has been supplied, even for multiple functional areas. Thus, a user may edit and commit changes for functional areas one at a time, or may edit multiple functional areas and then commit the changes for the multiple function areas all at once. Once the network device has implemented updated configuration data, the network device may send an acknowledge signal to the client that requested that the updated configuration data be implemented.

According to one embodiment of the invention, GUI 112 is updated to reflect the completion of each phase in the two-phase commit approach. Thus, a user is visually informed, through the GUI, of their progress as each functional area of configuration data is updated and then implemented on a network device. For example, when a user edits the configuration data for the common interface functional area and the updated configuration data is provided to the network device, but not yet implemented by the network device, the visual appearance of user interface object 206 is changed from a first state to a second state to reflect this condition. At this stage, all of the updated configuration data may be viewed by the user prior to committing the changes. When the user commits the changes and the updated configuration data is implemented by the network device, then the visual appearance of user interface object 206 is changed from the second state back to the first state to reflect that the configuration data displayed on GUI 112 is consistent with the configuration data implemented on the network device.

Consider the following example described with reference to a flow diagram 400 of FIG. 4. A user of client 102 selects to manage configuration data for network device 104. This may be done, for example, by the user selecting a user interface object on GUI 112 corresponding to network device 104 from a list of user interface objects associated with different available network devices.

In step 402, the functional areas supported by network device 104 are determined. A determination is also made as to which of these functional areas that the client 102 and network device 104 have compatible configuration APIs. In step 404, permission data 116 is consulted to determine which functional areas the user has permission to access. In step 406, user interface objects corresponding to the functional areas that are supported by network device 104 and for which client 102 and network device 104 have compatible configuration APIs are generated and displayed on GUI 112. The visual appearance of the user interface objects is selected to reflect the state of the corresponding functional area, including, for example, user permissions, version mismatch and component-specific locks. The visual appearance of the user interface objects may also be selected to reflect the applicability of the corresponding functional area to a particular context. For example, if an Ethernet card has been selected instead of all cards or a POS card, the visual appearance of the user interface object associated with the POS card would indicate that the POS card is disabled. The user interface objects that correspond to functional areas that the user does not have permission to access are displayed in a manner to visually indicate that the user does not have the required permission.

In step 408, user selection of a particular user interface object is detected, indicating that the user wishes to view the configuration data for the functional area corresponding to the particular user interface object. For example, the user may use a mouse to select user interface object 206 associated with the COMMON interfaces functional area. The configuration data for the COMMON interfaces functional area is displayed in display window 218. The visual appearance of user interface object 206 may be changed to visually indicate that user interface object 206 is currently selected so that the user knows that the configuration data displayed in display window 218 corresponds to the COMMON interfaces functional area.

In step 410, user input is detected that indicates that the user wishes to initiate an application to operate on the configuration data for the COMMON interfaces functional area. For example, the user may use a mouse and "right click" on user interface object 206 and then select from a list of available applications. Alternatively, the user may select a user interface object associated with an application from control panel 220, such as user interface object 222 associated with application APP1 or user interface object 224 associated with application APP2. The selected application is initiated in response to detecting the user input. Steps 408 and 410 are described as separate steps, but they may be performed in a single step. For example, a user may, in a single selection, launch an application to view and operate on configuration data for a particular functional area.

In step 412, in response to detecting completion of the editing of the configuration data, the updated configuration data is sent to network device 104. In step 414, GUI 112 is updated to reflect that the updated configuration data was received by network device 104. This may be performed, for example, in response to receiving a confirmation message from network device 104. Updating of GUI 112 may include, for example, changing the visual appearance of user interface object 206 to visually indicate that the configuration data for the COMMON interfaces functional area has been updated on network device 104. According to one embodiment of the invention, the visual appearance of user interface object 206 to visually indicate that the configuration data for the COMMON interfaces functional area has been updated on network device 104 but not yet implemented by network device 104.

In step 416 a user input to request that the updated configuration data be implemented by network device 104 is detected. The user input may include, for example, selection of user interface object 226 (COMMIT) to request that the changes be committed on network device 104. In response to detecting this user input, a request is sent to network device 104 to request that network device 104 implement the updated configuration data.

In step 418, GUI 112 is updated to reflect that the updated configuration data has been implemented by network device 104. This may be performed, for example, in response to receiving a confirmation message from network device 104 indicating that the updated configuration data has been implemented by network device 104. Updating of GUI 112 may include, for example, changing the visual appearance of user interface object 206 to visually indicate that the updated configuration data for the COMMON interfaces functional area has been implemented on network device 104.

VII. Multi-Client Implementations

The approach described herein for managing network device configuration data is applicable to multi-client implementations, i.e., implementations where more than one client may be configuring the same network device. One of the issues in multi-client applications is how to maintain the consistency of configuration data when more than one client can change the data. For example, suppose that both client 102 and another client (not depicted) are configured to update configuration data on network device 104. Suppose further that both client 102 and the other client download the configuration data for a particular functional area. If the other client modifies the configuration data and causes network device 104 to implement the modified configuration data, then the copy of the configuration data on client 102 is no longer consistent with the configuration data currently implemented on network device 104.

According to one embodiment of the invention, a locking mechanism is employed to guarantee that only one client can implement, i.e., commit, updated configuration data on a network device at any time. Various locking mechanisms may be employed, depending upon the requirements of a particular application, and the invention is not limited to any particular locking mechanism. For example, a locking mechanism might allow a commit lock to be granted to one client at a time, while providing read and update only access to any number of other clients. Suppose that client 102 requests and is granted a commit lock on particular configuration data associated with a particular functional area supported by network device 104. In this situation, only client 102 can implement updated configuration data until the write lock is released. Any number of other clients, however, can obtain and update, from network device 104, copies of the particular configuration data.

According to one embodiment of the invention, a notification mechanism is employed to notify clients that they no longer have the most current version of configuration data. This situation may occur if a client implements updated configuration data on a network device after the configuration data was provided to another client. For example, suppose that client 102 and another client both download from network device particular configuration data for a particular functional area. In this example, client 102 has a commit lock on the particular configuration data and the other client has read and update only access. Suppose further that client 102 updates its copy of the particular configuration data and downloads implements the updated configuration data on network device 104. In this situation, the configuration tool executing on the other client detects that an updated version of the original copy of the particular configuration data has been implemented on network device 104 since the other client downloaded its copy of the particular configuration data. This condition may be detected in a variety of ways. For example, the configuration tool executing on the other client may query network device 104 to determine whether the configuration data implemented by network device 104 has changed since the configuration data was downloaded. As another example, network device 104 may notify clients when it implements updated configuration data.

In response to detecting this condition, the other client updates its GUI to visually indicate to a user that this condition exists, i.e., that the copy of the particular configuration data on the other client is no longer consistent with the original copy of the particular configuration data implemented on network device 104. According to one embodiment of the invention, a user associated with the other client is given an opportunity to download and view the updated configuration data from network device 104. Alternatively, the user may view only the changes made to the configuration data. Both the locking mechanism and the notification mechanism may be employed on a per functional area basis.

VIII. Bulk Management of Network Device Configuration Data

According to one embodiment of the invention, configuration tool 114 is configured to provide bulk editing functions. These bulk editing functions allow changes to be readily made to multiple configuration data objects and to facilitate creating new configuration data objects. The bulk editing functions include 1) multi-row edit; 2) copy and paste; and 3) cloning.

A. Multi-Row Edit

Figure 5A:
Figure 5B:

The multi-row edit function allows an attribute for multiple portions of configuration data for a function area to be changed as part of a single user operation. FIGS. 5A and 5B are block diagrams that depict an example operation of the multi-row edit function according to an embodiment of the invention. In this example, configuration data 120 includes three rows of data, where each row contains four data items: an ID field; and IP address field (IP ADDR); a sequence number field (SEQ NO) and another attribute field (ATTRX). In this example each row of configuration data corresponds to a record or object within a functional area supported by network device 104. Various aspects of the invention are depicted in the figures and described in the context of configuration data presented on a GUI in rows for purposes of explanation only and the invention is not limited to operating on configuration data presented in rows.

Suppose that a user desires to change the "160" in the IP ADDR field for all rows to "150". Conventional configuration editing tools would require that each row of configuration data be separately updated. In the present example, the user instead selects the EDIT 228 user interface object to initiate the multi-row edit function. The multi-row edit function allows the user to select the IP ADDR field in all three rows of configuration data 120. When a user makes a change to any of the data items, the change is automatically propagated to the same data item in the other rows. For example, the user may use a mouse or other selection mechanism to select a user interface object associated with the IP ADDR column in configuration data 120. The user then edits the "160" portion of the IP ADDR field in one of the rows of configuration data 120. As depicted in FIG. 5B, the change is automatically applied to the IP ADDR field in the other rows of configuration data 120, eliminating the need for the user to separately edit the ID ADDR field in each row. The multi-row edit function is not limited to changing values in all rows of configuration data and may be used on a subset of rows. For example, a user may select the IP ADDR attribute for two rows of configuration data and update both values as part of a single user operation.

Figure 5C:

According to one embodiment of the invention, the multi-row edit function also allows a new attribute field to be added to multiple rows of configuration data in response to a single user operation. For example, referring again to FIG. 5A, suppose that a user desires to add an attribute field ATTRY to all rows of configuration data 120. Conventional configuration editing tools would require that the new attribute field ATTRY be separately added to each row of configuration data. In the present example, the user instead selects the EDIT 228 user interface object to initiate the multi-row edit function. The multi-row edit function allows the user to add the new attribute field ATTRY to all three rows of configuration data 120 simultaneously. For example, the user may use a mouse or other selection mechanism to select a user interface object, for example from control panel 220, elsewhere on GUI 112 or from a pull-down menu, associated with adding a new attribute field. The user then selects a label for the new attribute field to be displayed on GUI 112 and may also optionally select a default value. As depicted in FIG. 5C, the user has selected a display label of "ATTRY" and a default value of TR312. The default value may be selected so that customizing the value for each row requires minimal editing.

B. Copy and Paste

Figure 5D:

The copy and paste function provides a convenient way to edit existing configuration data. The copy and paste function allows a user to select a portion of configuration data for a functional area and copy the selected portion of configuration data onto another portion of the configuration data for the functional area, overwriting all the values. For example, suppose that a user desires to copy and paste the IP ADDR and ATTRX attribute values from the first row of configuration data of FIG. 5A into the third row of configuration data. The user selects the IP ADDR and ATTRX fields in the first row of configuration data and then copies and pastes the values in these fields into the corresponding fields in the third row of configuration data. As depicted in FIG. 5D, the values in the IP ADDR and ATTRX fields in the first row of configuration data have been copied into the third row of configuration data. The ID and SEQ NO fields maintain their original values.

Attribute values of a selected row of configuration data may be copied into any number of target rows. For example, suppose that configuration data 120 included twenty rows of configuration data. One or more attribute values from a selected row may be copied and pasted into any number of the other nineteen rows of configuration data, overwriting the attribute values in the other nineteen rows. Attribute values selected for copying and pasting do not need to be contiguous and may be individually selected. The particular GUI mechanism used to select and cause attributes to be copied and pasted may vary depending upon the requirements of a particular application and the invention is not limited to any particular GUI mechanism.

C. Clone

The clone function provides a convenient way to automatically generate new configuration data. In particular, the clone function allows a user to select existing configuration data and automatically generate and add N number of copies of the selected configuration data. For example, referring again to FIG. 5A, suppose that a user desires to add two rows of configuration data to configuration data 120. Conventional configuration editing tools would require that each new row be manually created and added to configuration data 120. In the present example, the user instead selects the CLONE 232 user interface object to initiate the clone function. The user then selects an existing row of configuration data and specifies a number of copies of the selected row to be generated and added to configuration data 120. The specified number of copies of the selected row are automatically added to configuration data 120.

The clone function allows a user to specify that the values for certain attributes in the new rows of configuration data are to be left blank. Alternatively, the clone function allows a user to specify that the values for certain attributes in the new rows of configuration data are to be determined based upon applying an algorithm to the original value from the selected row. For example, as depicted in FIG. 5E, the user has specified that two additional rows of configuration data are to be generated. The user has also specified that the values for the ATTRX attribute are to be blank in the new rows. The user has further specified that an algorithm is to be applied to the original value for both the ID and SEQ NO attributes to determine the corresponding attribute values for the new rows of configuration data. In the present example, this causes the values for both the ID and SEQ NO attributes to be automatically incremented by one. This is an example of a simple algorithm and more complex algorithms may be used, depending upon the requirements of a particular application. The application of an algorithm to field attributes may be made on a field by field basis and may involve the use of different algorithms for different fields. The values for the IP ADDR attribute in the new rows of configuration data are copied unchanged from the selected row. The number of new rows to be generated, the attributes to be automatically incremented and the increment value may be specified using conventional GUI techniques, such as menus and pop-up and dialog boxes.

IX. Implementation Mechanisms

Managing network device configuration data by functional area as described herein is very user friendly and less cumbersome and prone to errors than prior approaches. Users are able to view and edit configuration data for a single functional area of interest, without having to manage other configuration data on the network device. As described herein, a functional area may include only the configuration data for a particular hardware module installed in a network device. Alternatively, a functional area may include configuration data that is common to a plurality of hardware modules installed in a network device. Users are informed of their progress on the GUI as each functional area of configuration data is updated and then implemented on a network device. The approach also reduces bandwidth consumption when only data that has been updated is supplied to a network device. The bulk management features simplify and expedite the editing of existing configuration data and the creation of new configuration data.

Figure 6:
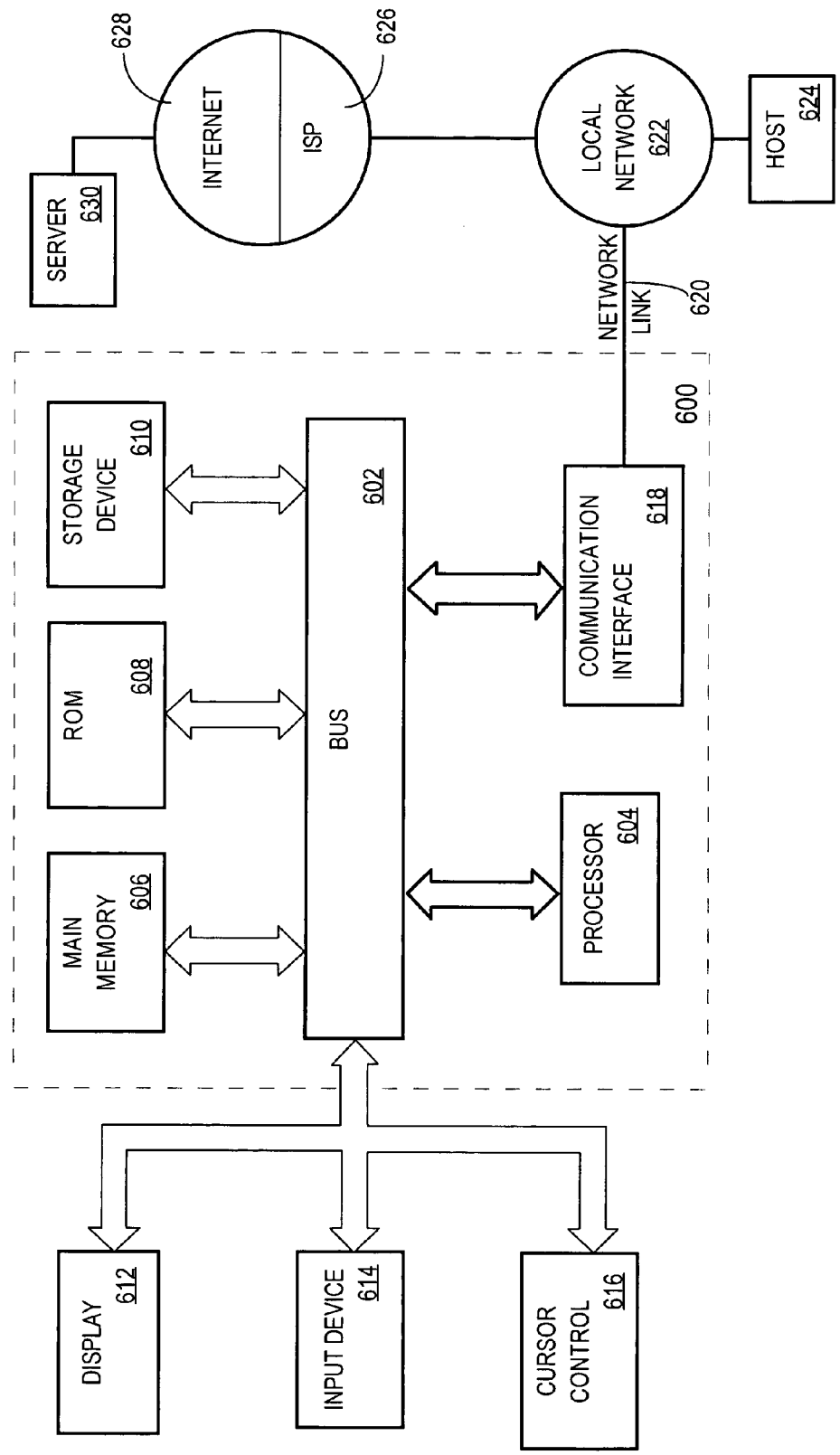
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for managing network device configuration data. According to one embodiment of the invention, the managing network device configuration data is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for the management of network device configuration data as described herein.

Processor 604 may execute the code as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing configuration data for a router, the method comprising the machine-implemented steps of:
   a client querying the router to determine a plurality of functional areas supported by the router;
   the client receiving, from the router, data indicating the plurality of functional areas supported by the router;
   the client generating and displaying a plurality of user interface objects on a graphical user interface, wherein each user interface object from the plurality of user interface objects corresponds to configuration data for one of the plurality of functional areas supported by the router;
      wherein generating and displaying the plurality of user interface objects further comprises, based on the data indicating the plurality of functional areas supported by the router, determining which user interface objects to generate and display;
      wherein determining which user interface objects to generate and display comprises identifying user interface objects (a) that correspond to the plurality of functional areas supported by the router; and (b) for which the client and the router have compatible application program interfaces; and
   in response to detecting a user selection of a particular user interface object from the plurality of user interface objects, the client:
      allowing the user to modify the configuration data corresponding to the particular user interface object to generate modified configuration data; and
      sending the modified configuration data to the router.

2. A machine-readable medium for managing configuration data for a router, the machine-readable medium carrying instructions which, when executed by one or more processors at a client, cause the one or more processors at the client to perform the steps of:
   querying the router to determine a plurality of functional areas supported by the router;
   receiving, from the router, data indicating the plurality of functional areas supported by the router;
   generating and displaying a plurality of user interface objects on a graphical user interface, wherein each user interface object from the plurality of user interface objects corresponds to configuration data for one of the plurality of functional areas supported by the router;
      wherein generating and displaying the plurality of user interface objects further comprises, based on the data indicating the plurality of functional areas supported by the router, determining which user interface objects to generate and display;
      wherein determining which user interface objects to generate and display comprises identifying user interface objects (a) that correspond to the plurality of functional areas supported by the router; and (b) for which the client and the router have compatible application program interfaces; and
   in response to detecting a user selection of a particular user interface object from the plurality of user interface objects,
      allowing the user to modify the configuration data corresponding to the particular user interface object to generate modified configuration data; and
      sending the modified configuration data to the router.

3. An apparatus for managing configuration data for a router, the apparatus comprising one or more processors and a memory storing instructions which, when executed by the one or more processors, cause the one or more processors at the apparatus to perform the steps of:
   querying the router to determine a plurality of functional areas supported by the router;
   receiving, from the router, data indicating the plurality of functional areas supported by the router;
   generating and displaying a plurality of user interface objects on a graphical user interface, wherein each user interface object from the plurality of user interface objects corresponds to configuration data for one of the plurality of functional areas supported by the router;
      wherein generating and displaying the plurality of user interface objects further comprises, based on the data indicating the plurality of functional areas supported by the router, determining which user interface objects to generate and display;
      wherein determining which user interface objects to generate and display comprises identifying user interface objects (a) that correspond to the plurality of functional areas supported by the router; and (b) for which the client and the router have compatible application program interfaces; and
   in response to detecting a user selection of a particular user interface object from the plurality of user interface objects,
      allowing the user to modify the configuration data corresponding to the particular user interface object to generate modified configuration data; and
      sending the modified configuration data to the router.

4. A method for managing network device configuration data, the method comprising the machine-implemented steps of:
   a client determining which of a plurality of functional areas are supported by a network device; and
   the client generating and displaying a plurality of user interface objects on a graphical user interface, wherein each user interface object from the plurality of user interface objects corresponds to configuration data for one of the plurality of functional areas that is supported by the network device;
      wherein generating and displaying the plurality of user interface objects further comprises, based on which of the plurality of functional areas are determined to be supported by the network device, determining which user interface objects to generate and display; and
      wherein determining which user interface objects to generate and display comprises identifying user interface objects (a) that correspond to the plurality of functional areas supported by the network device; and (b) for which the client and the network device have compatible application program interfaces.

5. The method as recited in claim 4, further comprising the machine-implemented step of selecting the visual appearance of a particular user interface object from the plurality of user interface objects to reflect a state of the configuration data corresponding to the particular user interface object.

6. The method as recited in claim 4, further comprising the machine-implemented step of in response to detecting a user selection of a particular user interface object from the plurality of user interface objects, retrieving, from the network device, configuration data corresponding to the particular user interface object, allowing the user to modify the configuration data corresponding to the particular user interface object to generate modified configuration data, and sending only the modified configuration data to the network device.

7. The method as recited in claim 6, further comprising the machine-implemented step of launching one or more of a plurality of application programs to allow the user to modify the configuration data corresponding to the particular user interface object.

8. The method as recited in claim 6, further comprising the machine-implemented step of changing the visual appearance of the particular user interface object to indicate to the user that the configuration data corresponding to the particular user interface object has been modified.

9. The method as recited in claim 6, further comprising the machine-implemented step of in response to detecting a user selection of another user interface object associated with committing changes in configuration data on network devices, sending to the network device a request for the network device to implement the modified configuration data.

10. The method as recited in claim 9, further comprising the machine-implemented step of in response to receiving a notification from the network device that the modified configuration data has been implemented by the network device, changing the visual appearance of the particular user interface object to indicate to the user that the modified configuration data has been implemented by the network device.

11. The method as recited in claim 4, further comprising the machine-implemented step of in response to determining that a particular functional area of the configuration data has been modified after the particular functional area of configuration data was received from the network device, changing the visual appearance of a particular user interface object from the plurality of user interface objects to visually indicate to a user that the particular functional area of the configuration data has been modified after the particular functional area of configuration data was received from the network device.

12. The method as recited in claim 4, wherein the step of determining which of the plurality of functional areas are supported by the network device includes querying the network device to determine which of the plurality of functional areas are supported by the network device.

13. The method as recited in claim 4, wherein the step of determining which of the plurality of functional areas are supported by the network device includes determining for which of the plurality of functional areas the network device and a client have compatible configuration application program interfaces.

14. The method as recited in claim 4, further comprising the machine-implemented steps of:

in response to detecting a user selection of a particular user interface object from the plurality of user interface objects, retrieving, from the network device, configuration data corresponding to the particular user interface object, displaying the configuration data on a graphical user interface; and in response to detecting that the configuration data retrieved from the network device is no longer consistent with configuration data implemented on the network device, changing the visual appearance of the particular user interface object to indicate that the configuration data retrieved from the network device is no longer consistent with configuration data implemented on the network device.

15. The method of claim 4 wherein the configuration data for at least two functional areas supported by the network device share a common configuration data item.

16. The method of claim 4, further comprising the steps of:

generating and displaying a common user interface object on the graphical user interface, wherein the common user interface object pertains to common configuration data for a common functional area, wherein the common functional area pertains to at least two interfaces of the network device;

receiving input that indicates a change to a data item in the common configuration data; and based upon the input, generating the modified configuration data, wherein the modified configuration data indicates changes for the at least two interfaces.

17. The method of claim 4, wherein:

the step of determining which of the plurality of functional areas are supported by the network device includes determining, based on permission data, that a user has permission to access one or more of the functional areas that are supported by the network device; and the step of generating and displaying the plurality of user interface objects further comprises, based on which one or more of the functional areas the user has permission to access, determining which user interface objects to generate and display.

18. A machine-readable storage medium for managing network device configuration data, the machine-readable medium storing instructions which, when executed by one or more processors at a client, cause the one or more processors at the client to perform the steps of:

determining which of a plurality of functional areas are supported by a network device; and generating and displaying a plurality of user interface objects on a graphical user interface, wherein each user interface object from the plurality of user interface objects corresponds to configuration data for one of the plurality of functional areas that is supported by the network device;

wherein generating and displaying the plurality of user interface objects further comprises, based on which of the plurality of functional areas are determined to be supported by the network device, determining which user interface objects to generate and display; and wherein determining which user interface objects to generate and display comprises identifying user interface objects (a) that correspond to the plurality of functional areas supported by the network device; and (b) for which the client and the network device have compatible application program interfaces.

19. The machine-readable storage medium as recited in claim 18, further storing one or more additional instructions which, when executed by the one or more processors, cause the one or more processors to perform the step of selecting the visual appearance of a particular user interface object from the plurality of user interface objects to reflect a state of the configuration data corresponding to the particular user interface object.

20. The machine-readable storage medium as recited in claim 18, further storing one or more additional instructions which, when executed by the one or more processors, cause the one or more processors to perform the step of in response to detecting a user selection of a particular user interface object from the plurality of user interface objects, retrieving, from the network device, configuration data corresponding to the particular user interface object, allowing the user to modify the configuration data corresponding to the particular user interface object to generate modified configuration data, and sending only the modified configuration data to the network device.

21. The machine-readable storage medium as recited in claim 20, further storing one or more additional instructions which, when executed by the one or more processors, cause the one or more processors to perform the step of launching one or more of a plurality of application programs to allow the user to modify the configuration data corresponding to the particular user interface object.

22. The machine-readable storage medium as recited in claim 20, further storing one or more additional instructions which, when executed by the one or more processors, cause the one or more processors to perform the step of changing the visual appearance of the particular user interface object to indicate to the user that the configuration data corresponding to the particular user interface object has been modified.

23. The machine-readable storage medium as recited in claim 20, further storing one or more additional instructions which, when executed by the one or more processors, cause the one or more processors to perform the step of in response to detecting a user selection of another user interface object associated with committing changes in configuration data on network devices, sending to the network device a request for the network device to implement the modified configuration data.

24. The machine-readable storage medium as recited in claim 23, further storing one or more additional instructions which, when executed by the one or more processors, cause the one or more processors to perform the step of in response to receiving a notification from the network device that the modified configuration data has been implemented by the network device, changing the visual appearance of the particular user interface object to indicate to the user that the modified configuration data has been implemented by the network device.

25. The machine-readable storage medium as recited in claim 18, further storing one or more additional instructions which, when executed by the one or more processors, cause the one or more processors to perform the step of in response to determining that a particular functional area of the configuration data has been modified after the particular functional area of configuration data was received from the network device, changing the visual appearance of a particular user interface object from the plurality of user interface objects to visually indicate to a user that the particular functional area of the configuration data has been modified after the particular functional area of configuration data was received from the network device.

26. The machine-readable storage medium as recited in claim 18, wherein the step of determining which of the plurality of functional areas are supported by the network device includes querying the network device to determine which of the plurality of functional areas are supported by the network device.

27. The machine-readable storage medium as recited in claim 18, wherein the step of determining which of the plurality of functional areas are supported by the network device includes determining for which of the plurality of functional areas the network device and a client have compatible configuration application program interfaces.

28. The machine-readable storage medium as recited in claim 18, further storing one or more additional instructions which, when executed by the one or more processors, cause the one or more processors to perform the steps of:

in response to detecting a user selection of a particular user interface object from the plurality of user interface objects, retrieving, from the network device, configuration data corresponding to the particular user interface object, displaying the configuration data on a graphical user interface; and in response to detecting that the configuration data retrieved from the network device is no longer consistent with configuration data implemented on the network device, changing the visual appearance of the particular user interface object to indicate that the configuration data retrieved from the network device is no longer consistent with configuration data implemented on the network device.

29. The machine-readable storage medium as recited in claim 18, wherein the configuration data for at least two functional areas supported by the network device share a common configuration data item, and further storing one or more additional instructions which, when executed by the one or more processors, cause the one or more processors to perform the steps of:

generating and displaying a common user interface object on the graphical user interface, wherein the common user interface object pertains to common configuration data for a common functional area, wherein the common functional area pertains to at least two interfaces of the network device;

receiving input that indicates a change to a data item in the common configuration data; and based upon the input, generating the modified configuration data, wherein the modified configuration data indicates changes for the at least two interfaces.

30. The machine-readable storage medium as recited in claim 18, wherein:

the step of determining which of the plurality of functional areas are supported by the network device includes determining, based on permission data, that a user has permission to access one or more of the functional areas that are supported by the network device; and the step of generating and displaying the plurality of user interface objects further comprises, based on which one or more of the functional areas the user has permission to access, determining which user interface objects to generate and display.

31. An apparatus for managing network device configuration data, the apparatus comprising one or more processors and a memory storing instructions which, when executed by the one or more processors at the client, cause the one or more processors at the client to perform the steps of:

determining which of a plurality of functional areas are supported by a network device; and generating and displaying a plurality of user interface objects on a graphical user interface, wherein each user interface object from the plurality of user interface objects corresponds to configuration data for one of the plurality of functional areas that is supported by the network device;

wherein generating and displaying the plurality of user interface objects further comprises, based on which of the plurality of functional areas are determined to be supported by the network device, determining which user interface objects to generate and display; and wherein determining which user interface objects to generate and display comprises identifying user interface objects (a) that correspond to the plurality of functional areas supported by the network device; and (b) for which the client and the network device have compatible application program interfaces.

32. The apparatus as recited in claim 31, wherein the memory further comprises one or more additional instructions which, when executed by the one or more processors, cause the one or more processors to perform the step of selecting the visual appearance of a particular user interface object from the plurality of user interface objects to reflect a state of the configuration data corresponding to the particular user interface object.

33. The apparatus as recited in claim 31, wherein the memory further comprises one or more additional instructions which, when executed by the one or more processors, cause the one or more processors to perform the step of in response to detecting a user selection of a particular user interface object from the plurality of user interface objects,
retrieving, from the network device, configuration data corresponding to the particular user interface object,
allowing the user to modify the configuration data corresponding to the particular user interface object to generate modified configuration data, and
sending only the modified configuration data to the network device.

34. The apparatus as recited in claim 33, wherein the memory further comprises one or more additional instructions which, when executed by the one or more processors, cause the one or more processors to perform the step of launching one or more of a plurality of application programs to allow the user to modify the configuration data corresponding to the particular user interface object.

35. The apparatus as recited in claim 33, wherein the memory further comprises one or more additional instructions which, when executed by the one or more processors, cause the one or more processors to perform the step of changing the visual appearance of the particular user interface object to indicate to the user that the configuration data corresponding to the particular user interface object has been modified.

36. The apparatus as recited in claim 33, wherein the memory further comprises one or more additional instructions which, when executed by the one or more processors, cause the one or more processors to perform the step of in response to detecting a user selection of another user interface object associated with committing changes in configuration data on network devices, sending to the network device a request for the network device to implement the modified configuration data.

37. The apparatus as recited in claim 36, wherein the memory further comprises one or more additional instructions which, when executed by the one or more processors, cause the one or more processors to perform the step of in response to receiving a notification from the network device that the modified configuration data has been implemented by the network device, changing the visual appearance of the particular user interface object to indicate to the user that the modified configuration data has been implemented by the network device.

38. The apparatus as recited in claim 31, wherein the memory further comprises one or more additional instructions which, when executed by the one or more processors, cause the one or more processors to perform the step of in response to determining that a particular functional area of the configuration data has been modified after the particular functional area of configuration data was received from the network device, changing the visual appearance of a particular user interface object from the plurality of user interface objects to visually indicate to a user that the particular functional area of the configuration data has been modified after the particular functional area of configuration data was received from the network device.

39. The apparatus as recited in claim 31, wherein the step of determining which of the plurality of functional areas are supported by the network device includes querying the network device to determine which of the plurality of functional areas are supported by the network device.

40. The apparatus as recited in claim 31, wherein the step of determining which of the plurality of functional areas are supported by the network device includes determining for which of the plurality of functional areas the network device and a client have compatible configuration application program interfaces.

41. The apparatus as recited in claim 31, wherein the memory further comprises one or more additional instructions which, when executed by the one or more processors, cause the one or more processors to perform the steps of:
in response to detecting a user selection of a particular user interface object from the plurality of user interface objects,
retrieving, from the network device, configuration data corresponding to the particular user interface object,
displaying the configuration data on a graphical user interface; and
in response to detecting that the configuration data retrieved from the network device is no longer consistent with configuration data implemented on the network device, changing the visual appearance of the particular user interface object to indicate that the configuration data retrieved from the network device is no longer consistent with configuration data implemented on the network device.

42. The apparatus as recited in claim 31, wherein:
the configuration data for at least two functional areas supported by the network device share a common configuration data item; and
the memory further comprises one or more additional instructions which, when executed by the one or more processors, cause the one or more processors to perform the steps of:
generating and displaying a common user interface object on the graphical user interface, wherein the common user interface object pertains to common configuration data for a common functional area, wherein the common functional area pertains to at least two interfaces of the network device;
receiving input that indicates a change to a data item in the common configuration data; and
based upon the input, generating the modified configuration data, wherein the modified configuration data indicates changes for the at least two interfaces.

43. The apparatus as recited in claim 31, wherein:
the step of determining which of the plurality of functional areas are supported by the network device includes determining, based on permission data, that a user has permission to access one or more of the functional areas that are supported by the network device; and
the step of generating and displaying the plurality of user interface objects further comprises, based on which one or more of the functional areas the user has permission to access, determining which user interface objects to generate and display.

* * * * *

UNITED STATES PATENT AND TRADEMARK OFFICE
CERTIFICATE OF CORRECTION

PATENT NO. : 7,606,888 B2  Page 1 of 1
APPLICATION NO. : 10/723301
DATED : October 20, 2009
INVENTOR(S) : Tanner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1316 days.

Signed and Sealed this

Twelfth Day of October, 2010

David J. Kappos
*Director of the United States Patent and Trademark Office*